United States Patent [19]

Morishima et al.

[11] 4,029,300

[45] June 14, 1977

[54] EXTRUDER OF THE DEGASSING AND MODIFICATION TYPE

[75] Inventors: Yukimasha Morishima, Kure; Minoru Yoshida; Kimiyasu Hanaki, both of Hiroshima, all of Japan

[73] Assignee: The Japan Steel Works Ltd., Tokyo, Japan

[22] Filed: May 3, 1976

[21] Appl. No.: 682,778

[30] Foreign Application Priority Data

Oct. 17, 1975 Japan .............................. 50-124424

[52] U.S. Cl. ................................ 259/192; 425/203
[51] Int. Cl.² .......................................... B29B 1/10
[58] Field of Search .............. 259/191, 192, 193, 9, 259/10, 6, 7, 8, 21, 22, 23, 24, 25, 26, 97; 425/203, 207, 208, 209

[56] References Cited

UNITED STATES PATENTS

| | | | |
|---|---|---|---|
| 3,287,477 | 11/1966 | Vesilind | 425/208 |
| 3,486,193 | 12/1969 | Gwinn | 425/203 |
| 3,762,693 | 10/1973 | DeBoo | 259/191 |
| 3,814,779 | 6/1974 | Wiley | 259/191 |
| 3,917,507 | 11/1975 | Skidmore | 259/192 |
| 3,963,558 | 6/1976 | Skidmore | 259/192 |

*Primary Examiner*—Robert W. Jenkins
*Attorney, Agent, or Firm*—Amster & Rothstein

[57] ABSTRACT

An extruder of the degassing and modification type, comprising a cylinder having at least one hopper orifice and at least one vent opening, and two adjoining screws mounted in the cylinder to be rotated in opposite directions. Each of the screws are formed by at least one feed section to be disposed below the hopper orifice, a kneading section, at least one mixing section to be disposed below the vent opening and a pressurizing section, and one of the screws is further formed by a metering section in series with the pressurizing section. Respective sections except for the kneading sections are generally formed from continuous flights and the flight angles are made different between the adjoining screws. The kneading sections are respectively provided with an adjusting ring and a gate ring arranged at a distance and a number of pins secured to the screws between the rings. Water may be introduced into the kneading section.

11 Claims, 5 Drawing Figures

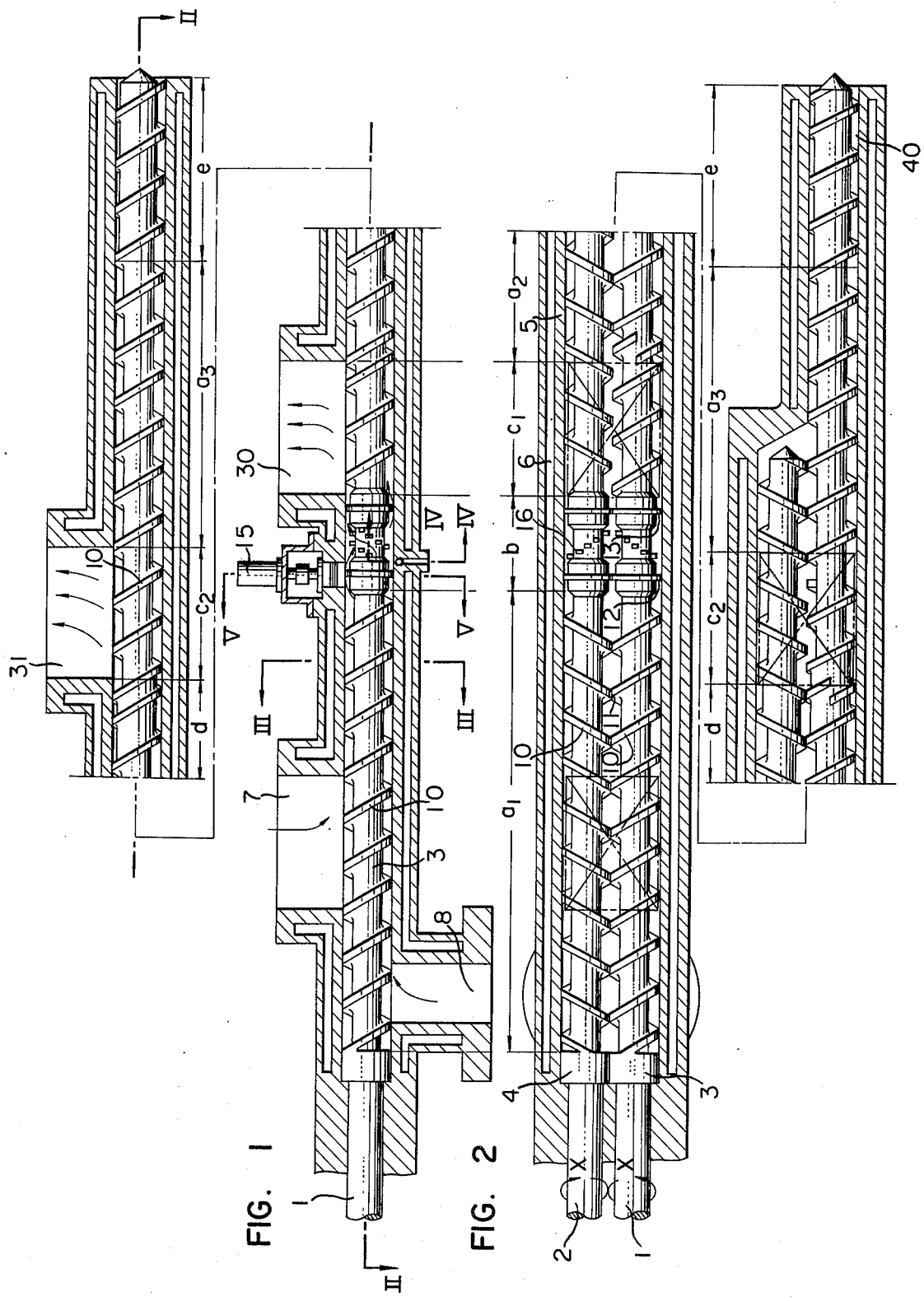

EXTRUDER OF THE DEGASSING AND MODIFICATION TYPE

BACKGROUND OF THE INVENTION

The present invention relates to an extruder, and more particularly to an extruder of the degassing and modification type in which the degassing, desolventation and modification of synthetic resins are directly performed.

One of the problems of the present processes is that in conventional polyethylene, issued from a polymerization apparatus, ethylene monomer, etc. are contained, which are unreacted in the polymerization process, that is, it has the danger of exploding, etc. To transport products containing ethylene monomer, etc. is legally prohibited in terms of safety. Therefore, in order to remove ethylene monomer, etc. a method has been conventionally carried out wherein pellets of conventional polyethylene are received in a tank and blown with hot air or inactive gas from the bottom so that the ethylene monomer, etc. contained in the pellets are discharged out of the tank accompanied by the hot air. However, these discharged poisonous gasses such as ethylene monomer, etc. are diffused in the air and endanger the health of residents living around factories which manufacture synthetic resins, and at present this is becoming a serious environmental problem as regards pollution. Further, conventional polyethylene is required to be modified, principally its optical properties, in order to improve its solid state properties.

On the other hand, in the manufacturing of synthetic rubber, as a method for separation of hexane from the synthetic rubber which hexane has been used as a solvent in the polymerization process, water displacement method has been applied, however, this method usually uses very large quantities of water.

On applying this method, hexane goes into water to be separated from synthetic rubber together with the water, which results in the generation of water containing hexane, so from the view point of pollution it cannot be directly discharged into sewerage or the like. This necessiates a treatment installation therefor.

In order to cope with these problems caused by the present processes, an apparatus is required that can simultaneously carry out a pelletizing, degassing, desolvention and modification of synthetic resins. An apparatus which can effectively perform these operations by a single device a single- or double-screw type extruder has been hitherto proposed.

The conventional single-screw type extruder has very few mechanical problems, however, it cannot sufficiently degass, desolvenize or modify material. On the other hand, a conventional double-screw type extruder has various problems of a mechanical nature which will be described below. If it is constituted in such a manner that both screws are made to mesh with each other or both screws are made not to mesh, but made to have flights as far as their forward ends, the screw thrust load due to pressure from molten resin at the forward ends of the screws is applied uniformly to both screws, but, in order to have a bearing construction to resist the screw thrust load the bearings are required to have a sufficiently larger outer diameter, whereas, in the case of the double-screw type extruder, since the distance between the axes of both screws is limited to a relatively small value, it is impossible to provide bearings having a large outer diameter to support the forward ends of the screws. Thus, in the double-screw type extruder it is impossible to have a construction to receive a large thrust load as compatible with that in the single-screw type extruder. Further, at a portion where the two screws are circumscribed with each other, since a hollow space is created from the necessity of machining, backflow of the molten resin is made large so that resin pressure cannot be generated at the forward portions of the screws.

Thus, it will be appreciated that since the conventional methods for degassing or desolvention pollute a natural environment such as atmosphere, water, etc. they are subjected to regulations concerning the prevention of pollution and extruders which have been conventionally adopted as means for obviating the problems with pollution still have various drawbacks.

SUMMARY OF THE INVENTION

It is one of the objectives of the present invention to provide an extruder of the degassing and modification type which can discard all of the defects inherent to the conventional degassing and modification type extruders as abovementioned.

Another objective of the present invention is to provide an extruder of the degassing and modification type which can effectively degas ethylene monomer, etc. from conventional polyethylene which accompanies them during manufacturing of the existing processes or effectively desolvent hexane, etc. from synthetic rubber which accompanies them during the manufacturing process.

It is a further objective of the present invention to provide an extruder of the degassing and modification type which in spite of a double-screw type configuration can mount a thrust bearing at the forward end of the screw which can resist a high thrust load as compatible with that of a single-screw type extruder.

According to the present invention an extruder of the degassing and modification type is provided which comprises a cylinder having at least one hopper orifice and at least one vent opening and two adjoining screws mounted in the cylinder so as to rotate in opposite directions. Each of the screws is formed with at least one feed section, substantially located below the hopper orifice, a kneading section, at least one mixing section substantially located below the vent orifice and a pressurizing section in order from the rear end. One of the screws is further formed with a metering section in series with the pressurizing section. The respective sections except for the kneading section are formed of substantially continuous flights having substantially the same outer diameters, and the directions of the flights are different between the adjoining screws. The kneading sections are respectively formed of an adjusting ring and a gate ring secured thereto at its rear and forward ends with a distance being apart therebetween and the kneading means secured to the screw between both ends, whereby the adjusting rings and the gate rings on the adjoining screws are respectively transversely aligned with each other so as to be substantially circumscribed. A piston means is disposed between both adjusting rings so that its bottom surface substantially corresponds to the outer peripheries of the adjusting rings, whereby the piston means is adapted so that it can be operated by a hydraulic cylinder secured to the cylinder.

One feature of the present invention is a water nozzle which is opened in the kneading sections through the cylinder.

A second feature of the present invention is that the outer surfaces of the flights of the feed and the pressurizing sections of the respective screws are circumscribed with each other, whereas the outer surfaces of the flights of the mixing sections of the respective screws are shifted for at least half the mean pitch of the flights.

Further, a third feature of the present invention is that the bottoms of the screws of the pressurizing and the metering sections of the screws are gradually made shallower from those of the preceding sections.

BRIEF DESCRIPTION OF THE DRAWINGS

These and other objects of the present invention will become more readily apparent upon reading of the following descriptions and upon referring to the accompanying drawings, in which:

FIG. 1 is an elevational sectional view of an embodiment of an extruder of the degassing and modification type in accordance with the present invention;

FIG. 2 is a horizontal sectional view of the extruder shown in FIG. 1 taken along the line II—II of FIG. 1;

DESCRIPTION OF A PREFERRED EMBODIMENT

Figure 3:
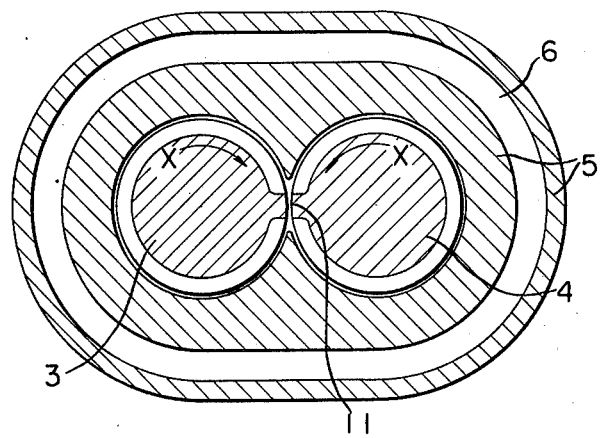
FIG. 3 is a transverse sectional view of the extruder shown in FIG. 1 taken along the line III—III of FIG. 1.
Figure 4:
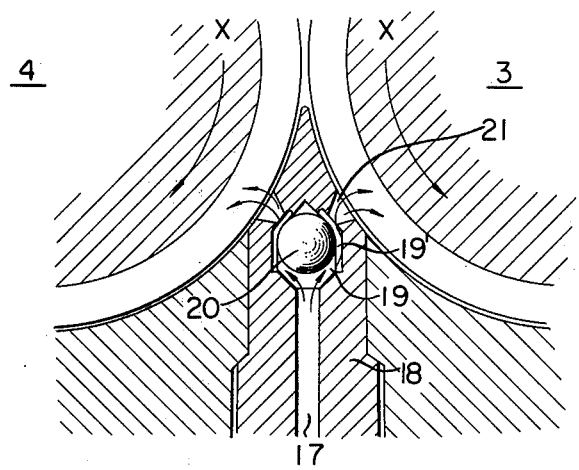
FIG. 4 is a transverse sectional view of the extruder shown in FIG. 1 taken along the line IV—IV of FIG. 1 in an enlarged scale.
Figure 5:
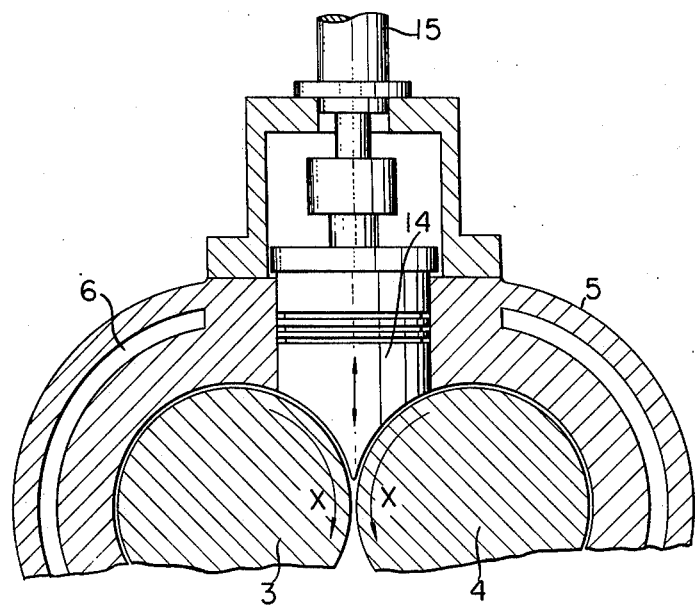
FIG. 5 is a transverse sectional view of the extruder shown in FIG. 1 taken along the line V—V of FIG. 1.

In FIGS. 1 and 2 of the drawings, a preferred embodiment of the present invention is presented, in which a main-driving shaft 1 to be driven in one direction by a not shown driving means and a sub-driving shaft 2 to be driven oppositely by the driving means are operatively connected to a main-screw 3 and sub-screw 4, respectively, by any suitable connecting means. Main- and sub-screws 3 and 4 are rotatably mounted in parallel relation within a cylinder 5, which is surrounded by an external heating-cooling jacket 6. Cylinder 5 is provided with an upper hopper orifice 7 on its upper portion near its rear part and a lower hopper orifice 8 on its lower portion at its rearmost part, whereby orifices 7 and 8 are respectively adapted to be supplied with molten synthetic resin at a temperature of about 130° to 320° C and molten synthetic resin having a particularly low viscosity. The synthetic resin supplied through hopper orifice 7 or 8 is fed forwards through cylinder 5 by both main- and sub-screws 3 and 4 which are rotating in the opposite direction as shown by the arrow X in FIG. 2 and generally formed with right-handed and left-handed screws or flights, respectively. Both screws 3 and 4 are respectively divided into several sections, i.e. feed sections $a_1$, $a_2$ and $a_3$ a knead section $b$, mixing sections $c_1$ and $c_2$ a pressurizing section $d$, and a metering section $e$. More precisely, main- and sub-screws 3 and 4 are formed in the order from their ends near driving shafts 1 and 2, respectively, with feed section $a_1$ to be arranged substantially above lower hopper orifice 8 and below upper hopper orifice 7, kneading section $b$, mixing section $c_1$ to be arranged substantially below vent opening 30, feed section $a_2$, pressurizing section $d$, mixing section $c_2$ to be arranged substantially below vent opening 31, section $a_3$. Additionally main-screw 3 is formed with metering section $e$ in series with feeding section $a_3$. At this point it should be noticed that the outer surfaces of flight portions 10 of main- and sub-screws 3 and 4 are disposed so as to abut each other at the portions where both screws 3 and 4 are circumscribed with each other at respective feed sections $a_1$, $a_2$ and $a_3$ as shown in FIG. 3. At kneading section $b$, both screws 3 and 4 are provided with an adjusting ring 12 having an outer diameter substantially identical to the outer diameter of screws 3 and 4 and a gate ring 13 having an outer diameter somewhat larger than that of adjusting ring 12, whereby adjusting and gate rings 12 and 13 apart at a distance, and both adjusting and gate rings 12 and 13 are respectively mounted on main- and sub- screws 3 and 4 so that respectively adjusting rings 12 and gate rings 13 are aligned transversely so that they substantially circumscribed with each other. Further disposed in the middle of adjusting rings 12 of both screws 3 and 4 is a piston 14 which is slidably mounted within a hydraulic cylinder 15 that is secured to cylinder 5 at its upper portion so that piston 14 can be moved up and down with the operation of cylinder 15. See FIG. 5. In this case, it will be appreciated that the bottom portion of piston 14 is so configurated that it is substantially circumscribed with the outer peripheries of both adjusting rings 12. Additionally main- and sub-screws 3 and 4 are respectively provided with a number of pins 16 between adjusting and gate rings 12 and 13, whereby pins 16 are respectively arranged on a spiral line having a spiral angle substantially the same as or opposite to that of flights 10 of screws 3 and 4, and they elongate for at least half the mean pitch of flights 10. Cylinder 5 is provided with a nozzle 18 having a water inlet 17 at a portion below screws 3 and 4 where pins 16 are embedded as shown in FIGS. 1 and 4. Nozzle 18 has such a constitution that water supplied thereto through water inlet 17 under pressure pushes a ball 20 upwards which is received in a hollow valve chamber 19 formed in the upper portion of nozzle 18, serving as a non-return valve, and water is injected into the confronting portions of screws 3 and 4 in cylinder 5 through a water passage 19' formed in the inner wall of valve chamber 19 and water discharge orifices 21 formed through the wall of valve chamber 19.

Mixing sections $c_1$ and $c_2$ are disposed below a first and a second vent openings 30 and 31, respectively, formed in cylinder 5 in its forward portion at its upper part, and flights 10 of the screw threads of main- and sub- screws 3 and 4 are shifted by half pitch where the screw threads are circumscribed with each other at mixing sections $c_1$ and $c_2$, whereas the outer surfaces of flights 10 of both of the screw threads abut again at feed sections $a_2$ and $a_3$ which directly connect with mixing sections $c_1$ and $c_2$, respectively. See FIG. 2.

Pressurizing section $d$ has its screw bottom gradually made shallower than those of preceeding feed sections $a_2$ so that it can apply a pressure to the resin directly before second vent opening 31.

Finally, metering section $e$ is formed only on main-screw 3 and has its screw bottom gradually made shallower than that of preceding feeding section $a_3$ as in pressurizing section $d$ so that a metering portion 40 is formed between the inside wall of cylinder 5 and the bottom of the screw thread.

As previously mentioned, lower hopper orifice 8 is used for supplying molten resin having a low viscosity, and when upper hopper orifice 7 is to be used lower hopper orifice 8 is shielded with a suitable cover. Further, when lower hopper orifice 8 is to be used, upper hopper orifice 7 may be used as a vent opening to remove a volatile matter from the molten resin.

Having described above the constitution of the extruder according to the present invention, its operation will now be fully explained below.

Since at feeding sections $a_1$, $a_2$ and $a_3$ the outer peripheries of flights 10 of main- and sub- screws 3 and 4 are made to abut with each other the ability of feeding molten resin at the circumscribing portions of flights 10 of both screws 3 and 4 as shown in FIG. 3 is large, so that the feeding of the resin under pressure is made possible. Accordingly, molten resin supplied through upper or lower hopper orifice 7, 8 is forcibly fed forwards owing to this ability. At this stage, on adjusting piston 14 to regulate the amount of resin to be supplied, disposed directly before first vent opening 30 of kneading section $b$, by the actuation of hydraulic cylinder 15, the feeding amount of the molten resin is regulated at will. Thus, the regulated amount of resin is urged through a gap formed between adjusting rings 12 and the inner wall of cylinder 5 and further through a gap formed between gate rings 13 and the inner wall of cylinder 5. At this point it should be recalled that the outer diameter of gate ring 13 is somewhat larger than that of adjusting ring 12. As a result the molten resin has an inclination to be filled within a gap i.e. kneading section $b$ formed between both rings 12 and 13 so that it is pressurized within kneading section $b$. During this stage of the operation water is injected into the high temperature resin through nozzle 18 from the outside, and the resin and the water are subjected to a sufficient kneading effect so that volatile matters, etc, contained in the resin are accompanied by steam which is vaporized from the water due to the heat of the resin to be discharged through first vent opening 30.

At this point it will be appreciated that although the injection of water is not always required depending on the properties of the resins to be treated the water injection is principally performed for the treatment of resins having less volatile matters since water assists in their degassing effect. In this case, since at mixing sections $c_1$ and $c_2$ flights 10 of main- and sub- screws 3 and 4 are shifted by a half pitch the resin supplied by the right-harded screw of main-screw 3 and that of sub-screw 4 are turned over between both screws 3, 4, resulting in a remarkably larger mixing effect than in a conventional single-screw type extruder. Consequently the renewal of the surfaces of the resins actively takes place in mixing sections $c_1$ and $c_2$ so that an efficient degassing effect can be realized.

In this case, when the amount of volatile matters originally contained in molten resin is so large that a desired degassing effect cannot be achieved merely by first vent opening 30 and second vent opening 31, therefore, if required, additional vent openings may be provided so that the amount of volatile matter can be made below the desired value. Further, in this case, second vent opening 31 and others may be injected with water at their directly front portions as in first vent opening 30 for the purpose of enhancing the degassing effect. Screws 3 and 4 may be required to exhibit an ability to feed molten resin forwards under pressure at the sections after second vent opening 31 depending on the feature of a pelletizer to be mounted to the forward end of the extruder. In this case, if the forward ends of the main- and sub- screws 3 and 4 are made to aligned with each other as in the conventional double-screw type extruder the resin pressure established at the forward end portions of both screws 3 and 4 will be directly applied to them as a considerably large thrust load, but, as previously mentioned, since the distance between both screws 3 and 4 is constrained in a relatively small value, bearings having a resistivity to such a large thrust load as compatible with the one as used in a single-screw type extruder can be by no means installed in the double-screw type extruder. However, in the present invention, since main-screw 3 is formed as a single-screw type at its forward end portion the resin pressure at the forward end portion of sub-screw 4 is small. Therefore, the thrust load of the whole screws is substantially borne merely by main-screw 3, and the bearing means at the forward end of main-screw 3 can be easily constructed so as to carry a high thrust load as compatible with that in a single-screw type extruder to resist a high resin pressure because of the single-screw configuration of main-screw 3 at its forward portion. Therefore, the gap between main-screw 3 and the inner wall of cylinder 5 can be made smaller so as to suppress the backflow of the resin and make it as small as possible.

Thus, it will be appreciated that in accordance with the present invention a metering to carry out a stable extrusion in the main-screw portion can be easily realized. For instance, in the case of the treatment of conventional ethylene, its temperature is lowered by the injection of a large quantity of cooling water into it from the outside so that it may be easily subjected to shearing in order to degas the ethylene gas, and at the same time metering section $e$ of main-screw 3 can apply a specific shearing effect to the resin by replacing it with a screw having a mixing head such as a Dulmadge torpedo or smear head so that its optical properties can be modified intentionally.

While a single preferred embodiment of the present invention has been described and illustrated herein it will be understood that many modifications in shape and size may be made while utilizing the teaching of the invention.

What is claimed is:

1. In an extruder of the degassing and modification type wherein two adjoining screws are mounted in a cylinder so that they are parallel to each other and rotate in opposite directions, the improvement comprises:
    said cylinder having at least one hopper orifice and at least one vent opening at its upper part in order from the rear end;
    each of said adjoining screws being formed with at least one feed section, a kneading section, at least one mixing section and a pressurizing section in order from the rear end, whereby said feed and mixing sections are located substantially below said hopper orifice and said vent opening of said cylinder, respectively;
    one of said adjoining screws being further formed with a metering section in series with said pressurizing section;
    said feed, mixing pressurizing and metering sections of said adjoining screws are formed respectively from a substantially continuous flight having the same outer diameter and the directions of said flights of said respective sections being different between said adjoining screws; and
    each of said kneading sections of said adjoining screws being formed by an adjusting ring and a gate ring secured thereto at the rear and front ends, respectively, with a distance being left therebetween and a kneading means provided on said screw between said rings, whereby the outer diameter of said adjusting ring being substantially the same as that of said flight and the outer diameter of said gate ring being somewhat larger than that of said adjusting ring, and said adjusting and gate rings of said adjoining screws being transversely aligned so as to be substantially circumscribed with each other respectively.

2. An extruder of the degassing and modification type as defined in claim 1 wherein said kneading means are a number of pins secured to said adjoining screw so as to be arranged on a spiral line having a spiral angle substantially the same as or opposite to that of said flights of respective sections of said adjoining screws for at least half the mean pitch of said flights.

3. An extruder of the degassing and modification type as claimed in claim 2 wherein a piston means are provided in wall of said cylinder between said adjusting rings of said adjoining screws and in alignment with said rings so that the bottom of said piston means has a configuration substantially corresponding to the outer peripheries of said rings, whereby said piston means are operable by a hydraulic cylinder means secured to said cylinder.

4. An extruder of the degassing and modification type as claimed in claim 1 wherein said kneading sections are adapted to be supplied with water through water supply means provided in the wall of said cylinder.

5. An extruder of the degassing and modification type as claimed in claim 1 wherein the outer peripheries of said flights of said feed sections and said pressurizing sections of said adjoining screws, respectively, are, circumscribed with each other, whereas said flights of said mixing sections of said adjoining screws are shifted from each other for substantially half the mean pitch of said flights.

6. An extruder of the degassing and modification type as claimed in claim 1 wherein the bottoms of said flights in said pressurizing sections of said adjoining screws are gradually shallowed from those of preceding said mixing sections.

7. An extruder of the degassing and modification type as claimed in claim 1 wherein the bottom of said flight in said metering section of said one of said adjoining screws gradually becomes shallow from that of preceding said pressurizing section.

8. An extruder of the degassing and modification type as claimed in claim 1 wherein an additional hopper orifice is provided under said cylinder at the rear portion of said hopper orifice.

9. An extruder of the degassing and modification type as claimed in claim 1 wherein said metering section of one of said adjoining screws is replaced by a Dulmadge torpedo or a smear head type screw.

10. An extruder of the degassing and modification type as claimed in claim 1 wherein between said mixing and said pressurizing sections of said adjoining screws further feed sections are provided respectively, and provided forwards between said pressurizing sections of said adjoining screws are further mixing section, respectively, whereby said cylinder is provided with a further vent opening above said further mixing sections of said adjoining screws.

11. An extruder of the degassing and modification type as claimed in claim 10 wherein said one of said adjoining screws is provided with a further feed section between said further mixing section and said metering section.

* * * * *